(12) United States Patent
Ikeda et al.

(10) Patent No.: US 7,095,690 B2
(45) Date of Patent: Aug. 22, 2006

(54) WRITE AND/OR ERASE METHOD AND STORAGE APPARATUS

(75) Inventors: Toru Ikeda, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 564 days.

(21) Appl. No.: 09/964,056

(22) Filed: Sep. 26, 2001

(65) Prior Publication Data

US 2002/0181364 A1 Dec. 5, 2002

(30) Foreign Application Priority Data

May 30, 2001 (JP) .............................. 2001-163252

(51) Int. Cl.
  *G11B 7/125* (2006.01)
  *G11B 7/005* (2006.01)

(52) U.S. Cl. ................................. 369/47.52; 369/59.18

(58) Field of Classification Search ............ 369/47.52, 369/47.53, 59.18, 53.18; G11B 7/125, 7/005
See application file for complete search history.

(56) References Cited

U.S. PATENT DOCUMENTS

| | | | |
|---|---|---|---|
| 4,669,072 A | | 5/1987 | Miura et al. ................... 369/44 |
| 5,140,580 A | * | 8/1992 | Ohara et al. .............. 369/53.18 |
| 5,257,255 A | | 10/1993 | Morimoto et al. ............. 369/53 |
| 5,333,138 A | * | 7/1994 | Richards et al. ............... 360/75 |
| 5,564,013 A | * | 10/1996 | Ito et al. ........................ 714/15 |
| 5,732,055 A | | 3/1998 | Masaki et al. |
| 5,831,951 A | | 11/1998 | Kamioka et al. |
| 5,920,534 A | * | 7/1999 | Furuta et al. ............. 369/59.18 |
| 5,991,251 A | * | 11/1999 | Sakurai et al. ............. 369/53.2 |
| 6,067,284 A | | 5/2000 | Ikeda et al. |
| 6,072,761 A | * | 6/2000 | Tani ........................... 369/116 |
| 6,115,338 A | | 9/2000 | Masaki et al. |
| 6,249,496 B1 | * | 6/2001 | Tsukahara et al. ........ 369/44.28 |
| 6,504,802 B1 | * | 1/2003 | Tsukahara et al. ........ 369/44.35 |
| 6,633,521 B1 | * | 10/2003 | Mochizuki et al. ....... 369/44.29 |

FOREIGN PATENT DOCUMENTS

| | | |
|---|---|---|
| EP | 392 561 | 10/1990 |
| EP | 565 162 | 10/1993 |
| JP | 61-090376 | 5/1986 |
| JP | 64-059642 | 3/1989 |
| JP | 01-277361 | 11/1989 |
| JP | 05-298770 | 11/1993 |
| JP | 06-089452 | 3/1994 |
| JP | 07-201042 | 8/1995 |
| JP | 09-063093 | 3/1997 |
| JP | 10-283730 | 10/1998 |
| JP | 110-16251 | 1/1999 |
| JP | 2000-099965 | 4/2000 |
| JP | 2000-182292 | 6/2000 |
| JP | 2000-187856 | 7/2000 |
| JP | 2000-215450 | 8/2000 |

\* cited by examiner

*Primary Examiner*—A M Psitos
(74) *Attorney, Agent, or Firm*—Greer, Burns & Crain, Ltd.

(57) ABSTRACT

A write and/or erase method is adapted to a storage apparatus having a function of changing a write and/or erase power of a light beam with respect to a recording medium. The write and/or erase method sets a write and/or erase slice level for detecting an off-track of the light beam with respect to a track on the recording medium depending on the write and/or erase power.

18 Claims, 10 Drawing Sheets

FIG.8

| RETRY COUNTER | OTPIMUM WRITE POWER [%] | SLICE LEVEL [μm] FOR DETECTING OFF-TRACK | OFF-TRACK DETECTION TIME CONSTANT [μs] | WRITE SLICE LEVEL [m/s²] FOR DETECTING SHOCK | SHOCK DETECTION TIME CONSTANT [μs] |
|---|---|---|---|---|---|
| 5 | −3 | 0.08 | 6.3 | 31.4 | 6.3 |
| 3 | −2 | 0.07 | 5.9 | 27.4 | 5.9 |
| 1 | −1 | 0.06 | 5.5 | 23.5 | 5.5 |
| 0 | 0 | 0.05 | 5 | 19.6 | 5 |
| 2 | +1 | 0.04 | 4.5 | 15.7 | 4.5 |
| 4 | +2 | 0.03 | 3.9 | 11.8 | 3.9 |
| 6 | +3 | 0.02 | 3.2 | 7.8 | 3.2 |

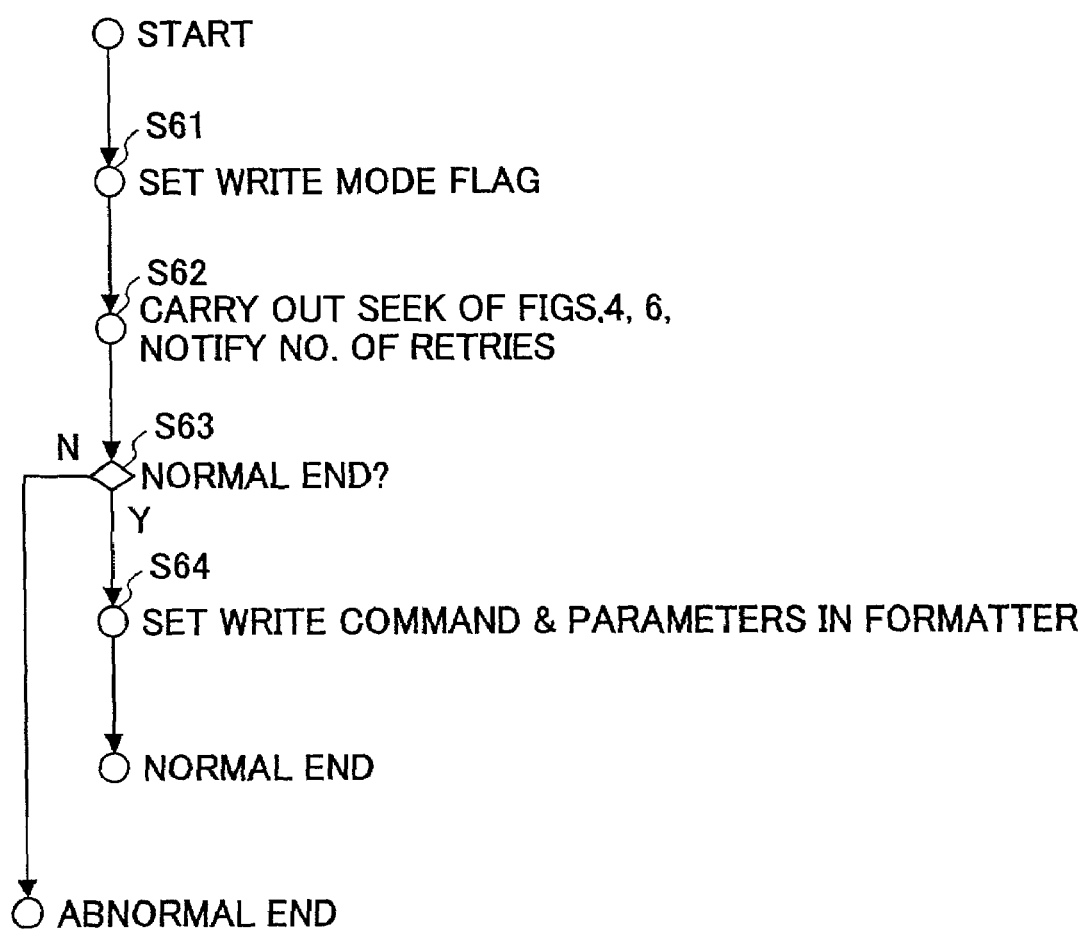

WRITE AND/OR ERASE METHOD AND STORAGE APPARATUS

BACKGROUND OF THE INVENTION

This application claims the benefit of a Japanese Patent Application No. 2001-163252 filed May 30, 2001, in the Japanese Patent Office, the disclosure of which is hereby incorporated by reference.

1. Field of the Invention

The present invention generally relates to write and/or erase methods and storage apparatuses, and more particularly to a write and/or erase method (hereinafter simply referred to as a write/erase method) which sets parameters which are used when writing and/or erasing (writing/erasing) with respect to a recording medium depending on a write and/or erase power (write/erase power), and to a storage medium which employs such a write/erase method.

In addition to magneto-optical disk units which record and/or reproduce (record/reproduce) information with respect to a land of a magneto-optical disk, there are proposed magneto-optical disk units which record/reproduce the information with respect to both a land and a groove of the magneto-optical disk. By employing the so-called land-groove recording system which records the information on both the land and the groove of the magneto-optical disk, it is possible to increase the recording density on the magneto-optical disk.

2. Description of the Related Art

In an optical recording medium, typified by a magneto-optical disk, which employs the land-groove recording system and has a narrow track pitch, there is a possibility of deteriorating a signal reproducing performance of a target track due to a signal interference caused by a signal written on an adjacent track. It is known that this signal interference is dependent on a write power of a light beam which is used to write the signal on the adjacent track, and dependent on a positional error of the light beam with respect to the track. In addition, it is also known that a tolerable amount of the positional error of the light beam with respect to the track decreases when the write power becomes large, and that the tolerable amount of the positional error of the light beam with respect to the track increases when the write power becomes small.

In other words, because the optical recording medium has the narrow track pitch, a thermal conduction easily occurs with respect to the adjacent track which is adjacent to the target track on which the information is written if the write power is large. As a result, the signal written on the adjacent track may be erased or, the signal written on the target track may leak into the adjacent track. For this reason, the write signal level of the adjacent track is deteriorated when the write power is large. Hence, a method of suppressing deterioration of the write signal level of the adjacent track by adjusting the write power has been proposed in a Japanese Laid-Open Patent Application No. 11-16251, for example.

Furthermore, when the write power is large, the signal from the adjacent tracks leaks when reading from the target track, because the optical recording medium has the narrow track pitch. Especially when the write power of the adjacent track is large, the signal read from the adjacent track easily leaks into the signal read from the target track.

According to the conventional storage apparatus, however, a limit of the write power is obtained on the assumption that the light beam scans the center of the track on the recording medium. For this reason, when an external vibration or shock is applied on the storage apparatus, the light beam actually scans a position deviated from the center of the track, and there was a possibility of deteriorating the signal of the adjacent track as described above.

On the other hand, a Japanese Laid-Open Patent Application No. 2000-182292 proposes a method which varies the write power during a write retry process, obtains a statistical write success rate with respect to the write power, and controls the write power to an optimum value based on the write success rate. In this case, the write power and/or the erase power are set intentionally, but it is necessary to set an off-track detection slice level which is used for detecting an off-track of the light beam by assuming a case where the write power and/or the erase power are high. As a result, the off-track is monitored very severely, and there was a possibility of detecting the off-track too sensitively.

SUMMARY OF THE INVENTION

Accordingly, it is a general object of the present invention to provide a novel and useful write/erase method and storage apparatus, in which the problems described above are eliminated.

Another and more specific object of the present invention is to provide a write/erase method and storage apparatus, which can positively prevent deterioration of a signal of an adjacent track, even when a light beam scans a position deviated from a center of a track on a recording medium or a certain error is generated in a write/erase power.

Still another object of the present invention is to provide a write and/or erase method adapted to a storage apparatus having a function of changing a write and/or erase power of a light beam with respect to a recording medium, comprising the steps of (a) setting a write and/or erase slice level for detecting an off-track of the light beam with respect to a track on the recording medium depending on the write and/or erase power. According to the write and/or erase method of the present invention, it is possible to positively prevent deterioration of a signal of an adjacent track, even when the light beam scans a position deviated from a center of a track on the recording medium or a certain error is generated in the write/erase power.

A further object of the present invention is to provide a write and/or erase method adapted to a storage apparatus having a function of changing a write and/or erase power of a light beam with respect to a recording medium, comprising the steps of (a) setting a write and/or erase slice level for detecting an external vibration or shock applied on the storage apparatus with respect to a track on the recording medium depending on the write and/or erase power. According to the write and/or erase method of the present invention, it is possible to positively prevent deterioration of a signal of an adjacent track, even when the light beam scans a position deviated from a center of a track on the recording medium or a certain error is generated in the write/erase power.

Another object of the present invention is to provide a write and/or erase method adapted to a storage apparatus having a function of changing a write and/or erase power of a light beam with respect to a recording medium, comprising the steps of (a) setting at least one parameter selected from write and/or erase parameters depending on the write and/or erase power, where the write and/or erase parameters include a write and/or erase slice level for detecting an off-track of the light beam with respect to a track on the recording medium, an off-track detection time constant, a write and/or erase slice level for detecting an external vibration or shock applied on the storage apparatus, and a shock detection time constant for detecting the external vibration or shock. According to the write and/or erase method of the present invention, it is possible to positively prevent deterioration of a signal of an adjacent track, even when the light beam scans a position deviated from a center of a track on the recording medium or a certain error is generated in the write/erase power.

A dependency of the write parameters with respect to the write power may be different from a dependency of the erase parameters with respect to the erase power.

Still another object of the present invention is to provide a storage apparatus having a function of changing a write and/or erase power of a light beam with respect to a recording medium, comprising a setting section for setting a write and/or erase slice level for detecting an off-track of the light beam with respect to a track on the recording medium depending on the write and/or erase power. According to the storage apparatus of the present invention, it is possible to positively prevent deterioration of a signal of an adjacent track, even when the light beam scans a position deviated from a center of a track on the recording medium or a certain error is generated in the write/erase power.

A further object of the present invention is to provide a storage apparatus having a function of changing a write and/or erase power of a light beam with respect to a recording medium, comprising a setting section for setting a write and/or erase slice level for detecting an external vibration or shock applied on the storage apparatus with respect to a track on the recording medium depending on the write and/or erase power. According to the storage apparatus of the present invention, it is possible to positively prevent deterioration of a signal of an adjacent track, even when the light beam scans a position deviated from a center of a track on the recording medium or a certain error is generated in the write/erase power.

Another object of the present invention is to provide a storage apparatus having a function of changing a write and/or erase power of a light beam with respect to a recording medium, comprising a setting section for setting at least one parameter selected from write and/or erase parameters depending on the write and/or erase power, where the write and/or erase parameters include a write and/or erase slice level for detecting an off-track of the light beam with respect to a track on the recording medium, an off-track detection time constant, a write and/or erase slice level for detecting an external vibration or shock applied on the storage apparatus, and a shock detection time constant for detecting the external vibration or shock. According to the storage apparatus of the present invention, it is possible to positively prevent deterioration of a signal of an adjacent track, even when the light beam scans a position deviated from a center of a track on the recording medium or a certain error is generated in the write/erase power.

Other objects and further features of the present invention will be apparent from the following detailed description when read in conjunction with the accompanying drawings.

BRIEF DESCRIPTION OF THE DRAWINGS

FIG. 8 is a diagram for explaining a relationship of a write power and various parameters;

FIG. 10 is a flow chart for explaining the processes of the MPU and the ODC when the write command is issued from the host unit.

DESCRIPTION OF THE PREFERRED EMBODIMENTS

Figure 1:
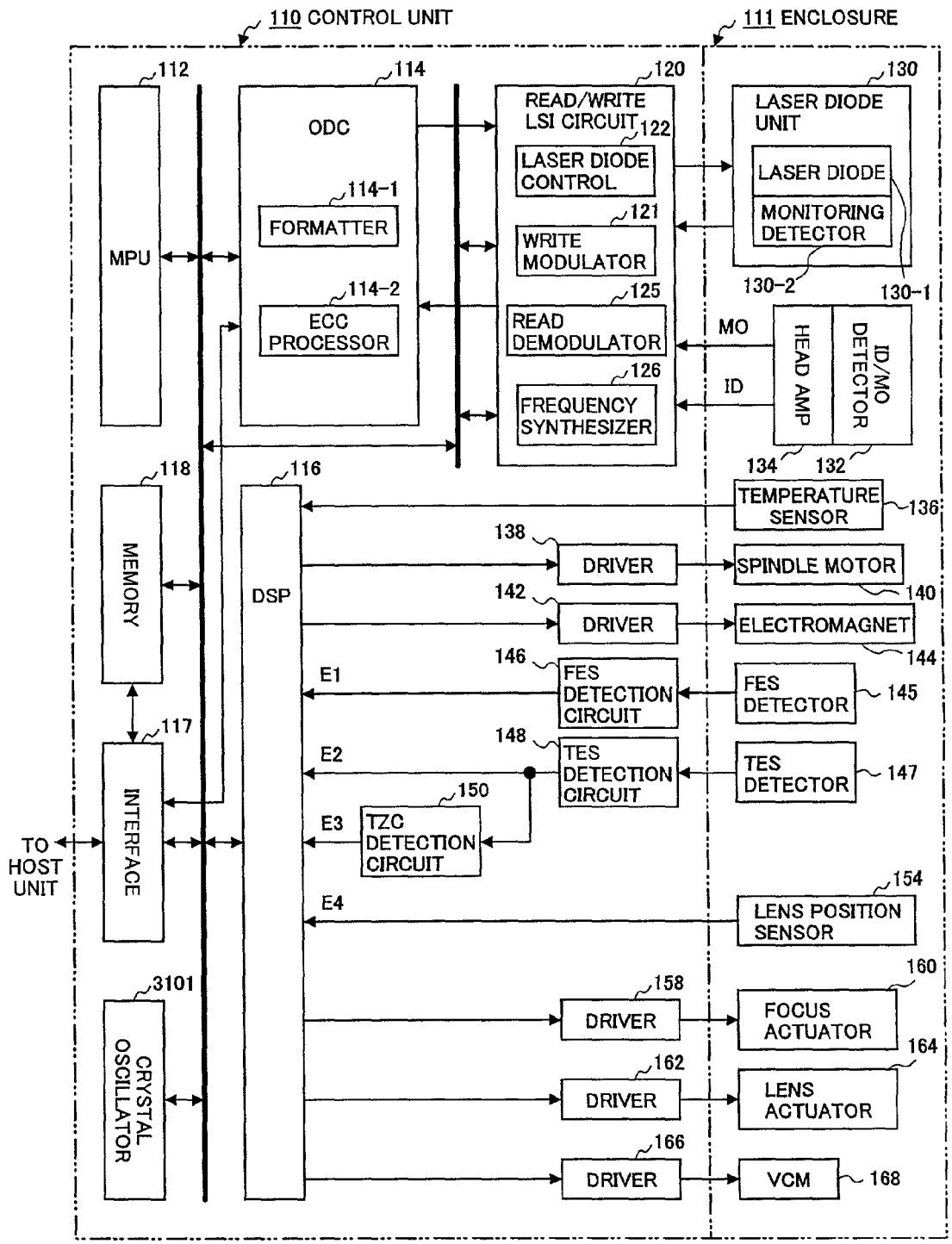
FIG. 1 is a system block diagram showing a structure of a first embodiment of a storage apparatus according to the present invention.

A description will be given of embodiments of a write/erase method according to the present invention and a storage apparatus according to the present invention, by referring to the drawings.

FIG. 1 is a system block diagram showing the structure of a first embodiment of the storage apparatus according to the present invention. As shown in FIG. 1, the optical disk unit generally includes a control unit 110 and an enclosure 111. The control unit 110 includes a microprocessor unit (MPU) 112 which generally controls the operation of the optical disk unit, an interface 117 which exchanges commands and data between a host unit (not shown), an optical disk controller (ODC) 114 which carries out processes required to read and write data with respect to an optical disk (not shown), a digital signal processor (DSP) 116, and a memory 118. The memory 118 is used in common by the MPU 112, the ODC 114 and the interface 114, and for example, includes a dynamic random access memory (DRAM), a nonvolatile memory which stores control programs and flag information, or the like. A crystal oscillator 3101 is coupled to the MPU 112.

The ODC 114 includes a formatter 114-1 and an error correction code (ECC) processor 114-2. At the time of a write access, the formatter 114-1 divides NRZ write data into sector units of the optical disk and generates a recording format, and the ECC processor 114-2 generates and adds an ECC with respect to sector write data units and also generates and adds if necessary a cyclic redundancy check (CRC) code. Further, the ECC processor 114-2 converts the sector data with the encoded ECC into a 1–7 run length limited (RLL) code, for example.

At the time of a read access, a reverse conversion of the 1–7 RLL is carried out with respect to the sector data, and after carrying out the CRC, the error detection and error correction using the ECC are carried out in the ECC processor 114-2. Further, the NRZ data in sector units are connected in the formatter 114-1 so as to transfer a NRZ read data stream to the host unit.

A read/write large scale integrated (LSI) circuit 120 is provided with respect to the ODC 114. This read/write LSI circuit 120 includes a write modulator 121, a laser diode control circuit 122, a read demodulator 125 and a frequency synthesizer 126. A control output of the laser diode control circuit 122 is supplied to a laser diode unit 130 which is provided in an optical unit of the enclosure 111. The laser diode unit 130 integrally includes a laser diode 130-1 and a monitoring detector 130-2. The write modulator 121 converts the write data into the data format of the pit position modulation (PPM) recording (or mark recording) or, a pulse width modulation (PWM) recording (or edge recording).

When recording and reproducing data with respect to the optical disk using the laser diode unit 130, this embodiment uses a writable magneto-optical (MO) cartridge medium employing the PWM recording which records the data in correspondence with the existence of mark edges on the optical disk. In addition, the recording format used by the optical disk is a 2.3 GB format using magnetic super resolution (MSR) and the ZCAV system. When the optical disk is loaded into the optical disk unit, an identification (ID) portion of the optical disk is first read, so as to recognize the type (storage capacity and the like) of the optical disk in the MPU 112 based on pit intervals of the ID portion. The MPU 112 notifies the recognition result indicating the type of optical disk to the ODC 114. For example, the type which is recognized may include information that the optical disk is a 3.5-inch disk and has a storage capacity of 128 MB, 230 MB, 540/640 MB, 1.3 GB or 2.3 GB.

The read/write LSI circuit 120 is also provided as a read system with respect to the ODC 114. The read demodulator 125 and the frequency synthesizer 26 are provided in the read/write LSI circuit 120, as described above. An ID/MO detector 132 of the enclosure 111 detects a laser beam emitted from the laser diode 130-1 and returned via the optical disk, and a detection signal from this ID/MO detector 132 is input as an ID signal (embossed pit signal) and a MO signal to the read/write LSI circuit 120 via a head amplifier 134.

The read demodulator 125 of the read/write LSI circuit 120 includes the functions of circuits such as an automatic gain control (AGC) circuit, a filter and a sector mark detection circuit. Hence, the read demodulator 125 generates a read clock and read data from the input ID signal and MO signal, and demodulates the PWM data back into the original NRZ data. In addition, since the ZCAV system is employed, the MPU 112 controls a setting of a frequency dividing ratio with respect to the frequency synthesizer 126 of the read/write LSI circuit 120 in order to generate a clock frequency in correspondence with the zone.

The frequency synthesizer 126 is a phase locked loop (PLL) circuit having a programmable frequency divider, and generates as a read clock a reproducing reference clock having a predetermined specific frequency depending on the zone position on the optical disk. In other words, the frequency synthesizer 126 is formed by the PLL circuit having the programmable frequency divider, and in a normal mode, generates the recording and/or reproducing reference clock having a frequency fo based on fo=(m/n)fi according to a frequency dividing ratio m/n which is set by the MPU 112 depending on a zone number.

A denominator n of the frequency dividing ratio m/n is a specific value depending on the type of optical disk. In addition, a numerator m of the frequency dividing ratio m/n is a value which changes depending on the zone position on the optical disk, and table information of the values corresponding to the zone numbers are prepared in advance with respect to each type of optical disk. Moreover, fi denotes a recording and/or reproducing reference clock frequency generated outside the frequency synthesizer 126.

The read data demodulated in the read/write LSI circuit 120 is supplied to the read system of the ODC 114, and after carrying out the reverse conversion of the 1–7 RLL, the CRC and the ECC processes are carried out by the encoding function of the ECC processor 114-2 so as to restore the original NRZ data. Next, the formatter 114-1 connects and converts the NRZ sector data into the NRZ data stream, and this NRZ read data stream is transferred to the host unit via the memory 118 and the interface 117.

A detection signal from a temperature sensor 136 provided in the enclosure 111 is supplied with respect to the MPU 112 via the DSP 116. Based on an environmental temperature within the optical disk unit detected by the temperature sensor 136, the MPU 112 controls the light emission powers for the read, write and erase in the laser diode control circuit 122 to optimum values.

The MPU 112 controls a spindle motor 140 provided in the enclosure 111 via the DSP 116 and a driver 138. In this embodiment, since the ZCAV system is employed as the recording format of the optical disk, the spindle motor 140 is rotated at a constant speed of 3637 rpm, for example.

In addition, the MPU 112 controls an electromagnet 144 provided in the enclosure 111 via the DSP 116 and a driver 142. The electromagnet 144 is arranged on a side opposite to the side of the optical disk on which the laser beam is irradiated within the optical disk unit which is loaded with this optical disk. This electromagnet 144 supplies an external magnetic field on the optical disk at the time of the recording and erasure. In the case of the optical disk having the 1.3 GB or 2.3 GB format employing the MSR, the electromagnet 144 also supplies the external magnetic field on the optical disk at the time of the MSR reproduction.

The DSP 116 is provided with a servo function for positioning the laser beam from the laser diode 130-1 with respect to the optical disk, and functions as a seek controller and an on-track controller which enable the laser beam to seek a target track and to be positioned on the target track. The seek control and the on-track control may be carried out simultaneously in parallel with the write access or the read access of the MPU 112 with respect to a host command.

In order to realize the servo function of the DSP 116, a focus error signal (FES) detector 145 is provided in the optical unit of the enclosure 111 so as to detect the laser beam emitted from the laser diode 130-1 and returned via the optical disk. A FES detection circuit 146 generates a FES E1 from a detection signal received from the FES detector 145, and inputs this FES E1 to the DSP 116.

A tracking error signal (TES) detector 147 is also provided in the optical unit of the enclosure 111 so as to detect the laser beam emitted from the laser diode 130-1 and returned via the optical disk. A TES detection circuit 148 generates a TES E2 from a detection signal received from the TES detector 147, and inputs this TES E2 to the DSP 116. The TES E2 is also input to a track zero crossing (TZC) detection circuit 150, and this TZC detection circuit 150 generates a TZC signal E3 which is input to the DSP 116.

A lens position sensor 154 is provided in the enclosure 111. This lens position sensor 154 detects a position of an object lens through which the laser beam is irradiated on the optical disk. A lens position detection signal (LPOS) E4 from the lens position sensor 154 is input to the DSP 116. The DSP 116 controls and drives a focus actuator 160, a lens actuator 164 and a voice coil motor (VCM) 168 via corresponding drivers 158, 162 and 166, so as to control the position of a beam spot formed by the laser beam on the optical disk.

Figure 2:
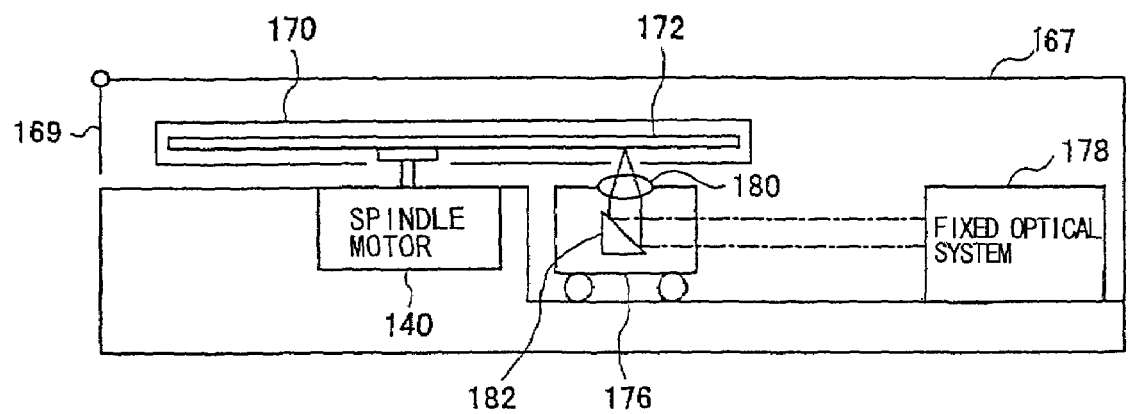
FIG. 2 is a cross sectional view showing a general structure of an enclosure.

FIG. 2 is a cross sectional view showing the general construction of the enclosure 111. As shown in FIG. 2, the spindle motor 140 is provided within a housing 167. By inserting a MO cartridge 170 into the housing 167 from the side of an inlet door 169, an optical disk (MO disk) 172 accommodated within the MO cartridge 170 engages a rotary shaft of the spindle motor 140, thereby loading the optical disk 172 with respect to the optical disk unit.

A carriage 176 is provided below the loaded optical disk 172 within the MO cartridge 170. This carriage 176 is freely movable in a direction which traverses tracks on the optical disk 172 when driven by the VCM 164. An objective lens 180 is mounted on the carriage 176. The laser beam emitted from the laser diode 130-1 which is provided within a fixed optical system 178 is reflected by a mirror 182, and is irradiated on the recording surface of the optical disk 172 via the objective lens 180, thereby forming a beam spot on the recording surface.

The movement of the objective lens 180 along an optical axis is controlled by the focus actuator 160 of the enclosure shown in FIG. 1. In addition, the objective lens 180 is movable in a radial direction which traverses the tracks on the optical disk 172 by the lens actuator 164, within a range of several tens of tracks. The position of the objective lens 180 mounted on the carriage 176 is detected by the lens position sensor 154 shown in FIG. 1. The lens position sensor 154 outputs the lens position detection signal E4 which takes a value zero at a neutral position where the optical axis of the objective lens 180 is perpendicular to the recording surface of the optical disk 172, and has a magnitude and a polarity depending on the amount the optical axis of the objective lens 180 moves towards the inner or outer peripheral side of the optical disk 172.

Figure 3:
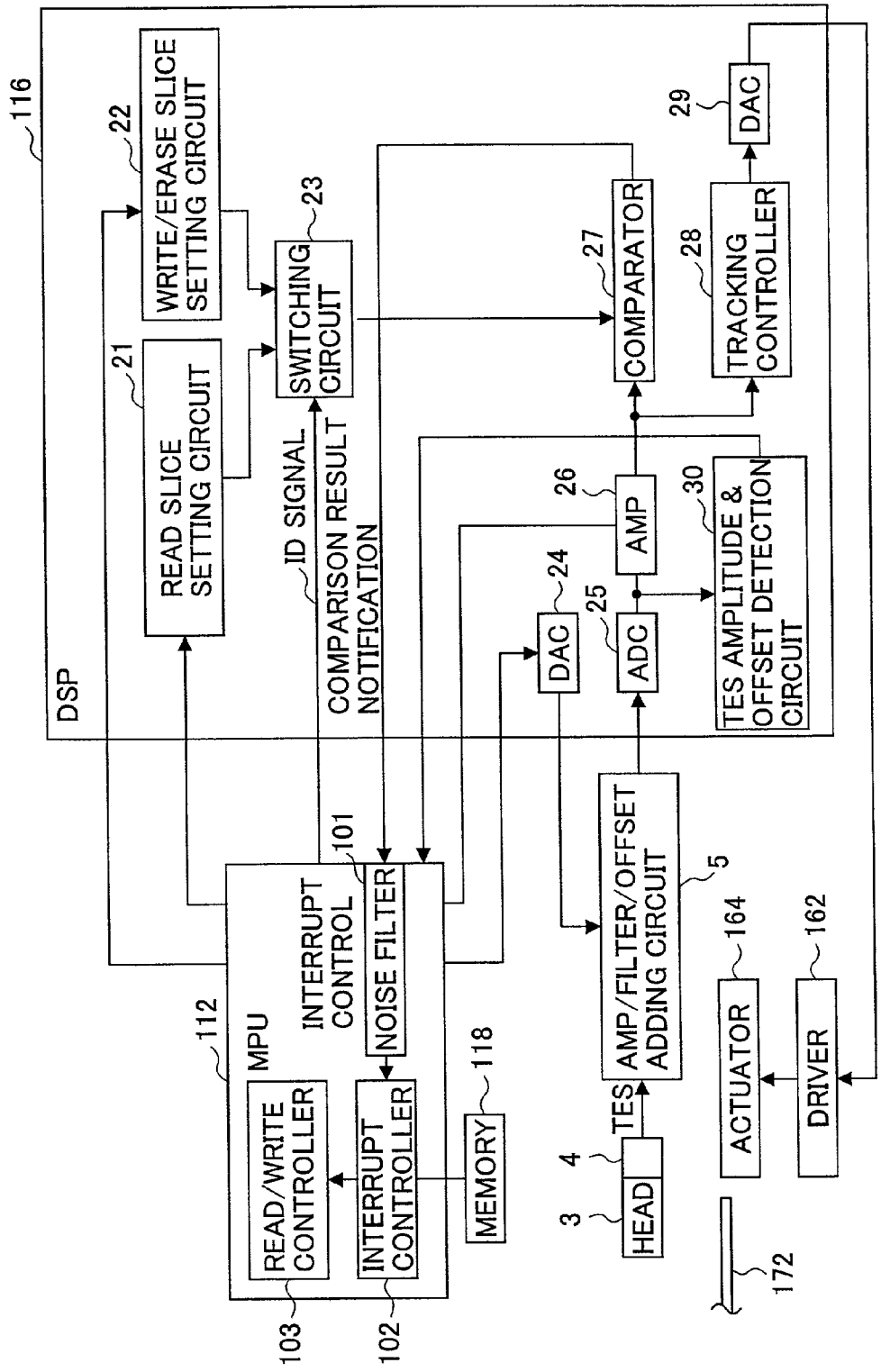
FIG. 3 is a system block diagram showing an important part of the first embodiment of the storage apparatus.

FIG. 3 is a system block diagram showing an important part of this first embodiment of the storage apparatus according to the present invention. In this first embodiment of the storage apparatus, the present invention is applied to a magneto-optical disk unit, such as that proposed in a Japanese Laid-Open Patent Application No. 11-16251, which is provided with the function of carrying out a retry process which carries out a retry until the write is successfully made while changing the write power. In addition, this first embodiment of the storage apparatus employs a first embodiment of a write/erase method according to the present invention. In FIG. 3, those parts which are the same as those corresponding parts in FIGS. 1 and 2 are designated by the same reference numerals, and a description thereof will be omitted.

In FIG. 3, the magneto-optical disk unit generally includes the MPU 112, the digital signal processor (DSP) 116, an optical head 3, a photodetector section 4, an amplifier and filter and offset adding circuit (amplifier/filter/offset adding circuit) 5, the driver 162, the actuator 164 and the memory 118.

The MPU 112 includes the functions of a noise filter 101, an interrupt controller 102, and a read/write controller 103. The memory 118 includes a ROM region and a RAM region. The ROM region stores programs which are executed by the MPU 112 and various data such as tables, while the RAM region stores data such as intermediate results of calculations made by the MPU 112.

The DSP 116 generally includes a read slice setting section 21, a write/erase setting section 22, a switching circuit 23, a digital-to-analog converter (DAC) 24, an analog-to-digital converter (ADC) 25, an amplifier 26, a comparator 27, a tracking controller 28 including a phase compensation filter function, a DAC 29, and a tracking error signal (TES) amplitude and offset detection circuit 30. The magneto-optical disk 172 may be free to be loaded into and unloaded from the magneto-optical disk unit, that is, detachable with respect to the magneto-optical disk unit. For the sake of convenience, FIG. 3 only shows portions of the firmware and the hardware of the DSP 116 related to the setting of the slice level which is used to detect the off-track of the light beam.

A focus control system, a magneto-optical disk driving system, a read/write signal processing system and the like are not directly related to the subject matter of the present invention, and the illustration of such systems is omitted in FIG. 3. In addition, the basic structure of the magneto-optical disk unit is not limited to the basic structure shown in FIG. 3, and various known basic structures may be employed instead as long as a processor such as the DSP 116 is capable of carrying out the operations which will be described hereunder.

In FIG. 3, a light beam is irradiated on the magneto-optical disk 172 by the optical head 3, and of the light beam which is reflected from the magneto-optical disk 172, a light component which is used for tracking control is detected by the photodetector section 4. Hence, the TES is supplied to the ADC 25 within the DSP 116 via the amplifier/filter/offset adding circuit 5. The optical head 3 and the photodetector section 4 correspond to the laser diode unit 130, the ID/MO detector 132, the head amplifier 134, the FES detector 145 and the TES detector 147 shown in FIG. 1. The amplifier/filter/offset adding circuit 5 is provided with an amplifying function, a filtering function, and an offset adding function. The ADC 25 supplies the digitally converted TES to the amplifier 26 and the TES amplitude and offset detection circuit 30. The TES amplitude and offset detection circuit 30 detects a positive peak value and a negative peak value of the TES, and supplies the detected peak values to the MPU 112.

Based on the positive and negative peak values supplied from the TES amplitude and offset detection circuit 30, the MPU 112 supplies an offset amount to the amplifier/filter/offset adding circuit 5 via the DAC 24 within the DSP 116 so that the tracking control is carried out in a vicinity of zero TES, so as to correct the offset of the TES, and also controls the gain of the amplifier 26 within the DSP 116 so that the amplitude of the TES becomes a prescribed amplitude. Hence, a normalized TES in which a deviation amount with respect to the level of the TES is normalized, is obtained from the amplifier 26 and supplied to the comparator 27.

The normalized TES from the amplifier 26 is also supplied to the tracking controller 28. The tracking controller 28 carries out a phase compensation and the like with respect to the normalized TES, and outputs a positional error with respect to a tracking target. This positional error is supplied to the actuator 164 via the DAC 29 and the driver 162 so as to control the actuator 164 by a known method, in order to control the optical head 3, that is, to carry out the tracking control with respect to the light beam.

At the time of a read, the MPU 112 sets to the read slice setting section 21 a read slice level which is appropriate for detecting an off-track during the read. In addition, at the time of the write/erase, the MPU 112 sets to the write/erase slice setting section 22 a write/erase slice level which is calculated and is used for detecting the off-track during the write/erase. Furthermore, the MPU 112 supplies to the switching circuit 23 an identification signal which indicates the read or the write/erase. Hence, based on this identification signal, the switching circuit 23 supplies the read slice level from the read slice setting section 21 to the comparator 26 during the read, and supplies the write/erase slice level from the write/erase slice setting section 22 to the comparator 27 during the write/erase.

A read slice level for a test track which will be described later may also be set in the read slice setting section 21, and a write/erase slice level for the test track may also be set in the write/erase slice setting section 22. Hence, the illustration of the setting section for setting the read/write/erase slice level for the test track will be omitted in FIG. 3. The test track on the magneto-optical disk 172 is a region which is provided for adjusting the power of the light beam by a test write and a test read proposed in the Japanese Laid-Open Patent Application No. 11-16251, for example, and no user data will be written on the test track. Such a test write region is provided at least for every one or more areas determined for each type of recording medium.

At the time of the read, the comparator 27 compares to determine whether the normalized TES from the amplifier 26 exceeds the read slice level which is obtained via the switching circuit 23, and reports the comparison result to the MPU 112. Similarly, at the time of the write/erase, the comparator 27 compares to determine whether the normalized TES from the amplifier 26 exceeds the write/erase slice level which is obtained via the switching circuit 23, and reports the comparison result to the MPU 112. When the comparison result reported from the comparator 27 indicates that the normalized TES exceeds the read slice level (off-track report) at the time of the read, the MPU 112 recognizes an off-track, and makes an error notification or the like with respect to the read/write controller 103 in response to the off-track error report. On the other hand, when the comparison result reported from the comparator 27 indicates that the normalized TES exceeds the write/erase slice level (off-track report) at the time of the write/erase, the MPU 112 recognizes an off-track, and an interrupt is generated with respect to the write/erase process in response to the off-track report, so as to immediately discontinue the write/erase process by the interrupt controller 102 and prevent data destruction on the magneto-optical disk 172.

Figure 4:
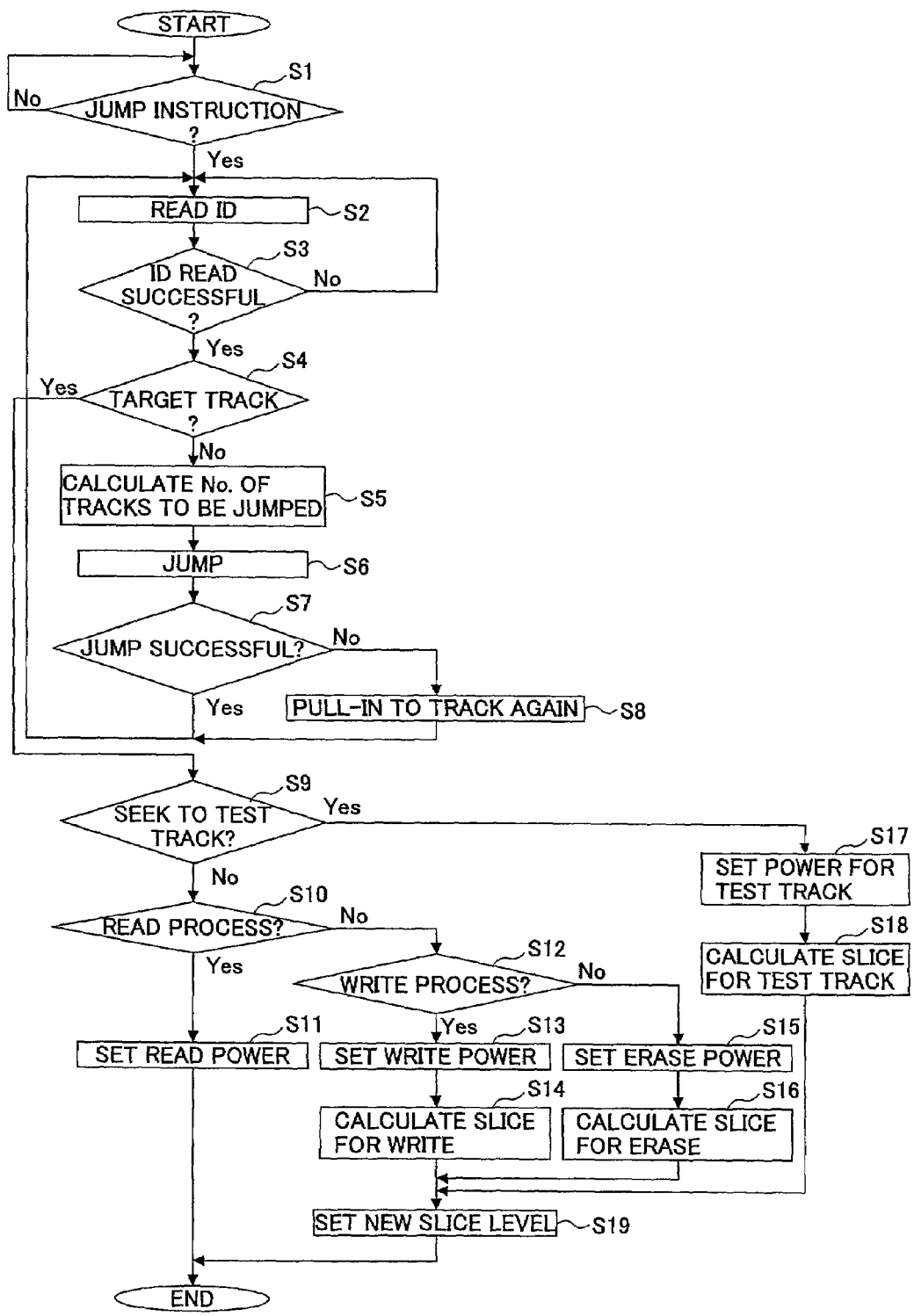
FIG. 4 is a flow chart for explaining an operation of a MPU of the first embodiment of the storage apparatus.

FIG. 4 is a flow chart for explaining an operation of the MPU 112 of this first embodiment of the storage apparatus. The process shown in FIG. 4 is started when a seek command is issued from the host unit, for example.

In FIG. 4, a step S1 decides whether or not a jump instruction is issued in conjunction with the seek command. If the decision result in the step S1 is YES, a step S2 reads an identification (ID) information portion of the magneto-optical disk 172, such as the sector number and the track number. A step S3 decides whether or not the read of the ID portion was successful, and the process returns to the step S2 if the decision result in the step S3 is NO. On the other hand, if the decision result in the step S3 is YES, a step S4 decides whether or not a target track included in the seek command is reached, and the process advances to a step S9 which will be described later if the decision result in the step S4 is YES.

If the decision result in the step S4 is NO, a step S5 calculates a number of tracks which are to be jumped in order to reach the target track, and a step S6 jumps the calculated number of tracks. A step S7 decides whether or not the jump was successful, and the process returns to the step S2 if the decision result in the step S7 is YES. If the decision result in the step S7 is NO, a step S8 carries out a pull-in to the track again (hereinafter referred to as a repull-in), and the process returns to the step S2.

The step S9 decides whether or not the seek command instructs a seek to a test track. If the decision result in the step S9 is NO, a step S10 decides whether or not the seek command instructs a read process. If the decision result in the step S10 is YES, a step S11 sets the power of the light source of the light beam emitted from the optical head 3 to a read power which is dependent on the sector, of the magneto-optical disk 172, including the target track. After the step S1, the process ends and the operation advances to a known read process. In the case of the read process, it is assumed that the appropriate read slice level for detecting the off-track at the time of the read is obtained in advance and set in the read slice setting section 21, as described above. Since the read power is controlled to a level which would not affect the adjacent track even if a slight off-track occurs at the time of the read, the read slice level is not changed depending on the read power in FIG. 4.

On the other hand, if the decision result in the step S10 is NO, a step S12 decides whether or not the seek command instructs a write process. If the decision result in the step S12 is YES, a step S13 sets the power of the light source of the light beam emitted from the optical head 3 to a write power which is dependent on the sector, of the magneto-optical disk 172, including the target track. In addition, a step S14 calculates a write slice level for detecting the off-track, and the process advances to a step S19 which will be described later. If the decision result in the step S12 is NO, a step S15 sets the power of the light source of the light beam emitted from the optical head 3 to an erase power which is dependent on the sector, of the magneto-optical disk 172, including the target track. Moreover, a step S16 calculates an erase slice level for detecting the off-track, and the process advances to the step S19 which will be described later.

For example, the write slice level can be obtained from the following first order formula, where RSL denotes a write slice level, RSLD denotes a default value of the write slice level RSL, A denotes a coefficient having a negative value, and X denotes a ratio, described in ±%, of a write power at the time of an off-track and a write power at the time when the center of the track is scanned by the light beam.

$$RSL = RSLD + A \times X$$

Accordingly, when the write power is increased, the write slice level for detecting the off-track is decreased, so that the off-track can be monitored under a severe condition. On the other hand, when the write power is decreased, the write slice level for detecting the off-track is increased, so that the off-track can be monitored under a more relaxed condition.

Similarly, the erase slice level can be obtained from the following first order formula, where ESL denotes an erase slice level, ESLD denotes a default value of the erase slice level RSL, B denotes a coefficient having a negative value, and X denotes a ratio, described in ±%, of a write power at the time of an off-track and a write power at the time when the center of the track is scanned by the light beam. Normally, B<A, and the power dependencies of the erase slice level and the write slice level are different.

$$ESL = ESLD + B \times X$$

Hence, when the erase power is increased, the erase slice level for detecting the off-track is decreased, so that the off-track can be monitored under a severe condition. On the other hand, when the erase power is decreased, the erase slice level for detecting the off-track is increased, so that the off-track can be monitored under a more relaxed condition.

If the decision result in the step S9 is YES, a step S17 sets the power of the light source of the light beam emitted from the optical head 3 to a read/write/erase power which is dependent on the test track of the magneto-optical disk 172. Moreover, a step S18 calculates a read/write/erase slice level for detecting the off-track, for the test track of the magneto-optical disk 172, and the process advances to the step S19. The write/erase slice level for detecting the off-track for the test track is normally set to a value which is greater than (for example, two times) the write/erase slice level for detecting the off-track during the normal write/erase process, so that the off-track is monitored under a relaxed condition.

The step S19 sets the slice level which is calculated in the step S14, S16 or S18, in the slice setting section 21 or 22, and the process ends. After the process ends, the operation advances to a known write/erase process or a test track read/write/erase process.

The setting itself of the read/write/erase power is known from the Japanese Laid-Open Patent Application No. 11-16251, for example, and a description thereof will be omitted in this specification.

In this embodiment, the write/erase slice level for detecting the off-track is set, but it is also possible to similarly set a time constant for detecting the off-track (hereinafter referred to as an off-track detection time constant). In this case, the steps S13 and S14 or, the steps S15 and S16, shown in FIG. 4, set the off-track detection time constant for the write/erase in place of or, in addition to, the calculation and setting of the write/erase slice level. The off-track detection time constant may be set by setting the time constant of the noise filter 101 within the MPU 112 based on the comparison result notified from the comparator 27.

Accordingly, it is possible to change and set the write/erase slice level and/or the off-track detection time constant for detecting the off-track, depending on the change in the optimum write/erase power. The optimum write/erase power is updated with every test write/erase, but during the normal write/erase before and after the updating, the write/erase slice level and/or the off-track detection time constant are not changed.

Figure 5:
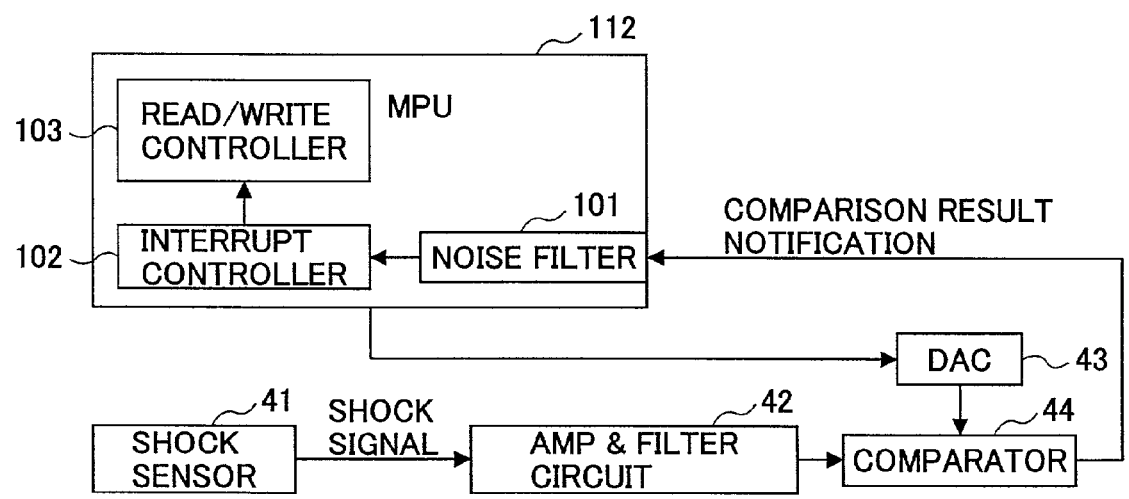
FIG. 5 is a system block diagram showing an important part of a second embodiment of the storage apparatus according to the present invention.

FIG. 5 is a system block diagram showing an important part of a second embodiment of the storage apparatus according to the present invention. In this second embodiment of the storage apparatus, the present invention is applied to a magneto-optical disk unit, such as that proposed in the Japanese Laid-Open Patent Application No. 11-16251, which is provided with the function of carrying out a retry process which carries out a retry until the write is successfully made while changing the write power. In addition, this second embodiment of the storage apparatus employs a second embodiment of the write/erase method according to the present invention. In FIG. 5, only the main elements are shown, and those parts which are the same as those corresponding parts in FIG. 3 are designated by the same reference numerals, and a description thereof will be omitted.

In FIG. 5, a shock sensor 41 detects an external vibration or shock applied to the magneto-optical disk unit, and outputs a shock signal. The shock signal is supplied to a comparator 44 via an amplifier and filter circuit 42 which is provided with an amplifying function and a filtering function. More particularly, the amplifier and filter circuit 42 amplifies the shock signal to a signal amplitude with which a required sensitivity can be obtained, and eliminates noise in the shock signal, before supplying the shock signal to the comparator 44. On the other hand, the MPU 112 supplies a reference shock signal to the comparator 44 via a DAC 43. Accordingly, the comparator 44 makes a comparison to determine whether or not the shock signal from the amplifier and filter circuit 42 has a level exceeding the reference shock signal, and reports the comparison result to the MPU 112. When a comparison result report (shock detection report) which indicates that the shock signal from the amplifier and filter circuit 42 has a level exceeding the reference shock signal is received from the comparator 44 at the time of the write/erase, the MPU 112 recognizes a shock detection. In addition, an interrupt is generated with respect to the write/erase process in response to the shock detection report, and the write/erase process is immediately discontinued by the interrupt controller 102, so as to prevent data destruction on the magneto-optical disk 172.

The shock sensor 41 is made of a known element which outputs a current or a voltage which is dependent on an internal distortion of the element when an external shock is applied to the element. In other words, the shock sensor 41 outputs a current or a voltage which is proportional to an acceleration which is applied thereto. For this reason, this output of the shock sensor 41 may be sliced at a prescribed slice level, and the write/erase process may be discontinued when this output of the shock sensor 41 exceeds the slice level.

Figure 6:
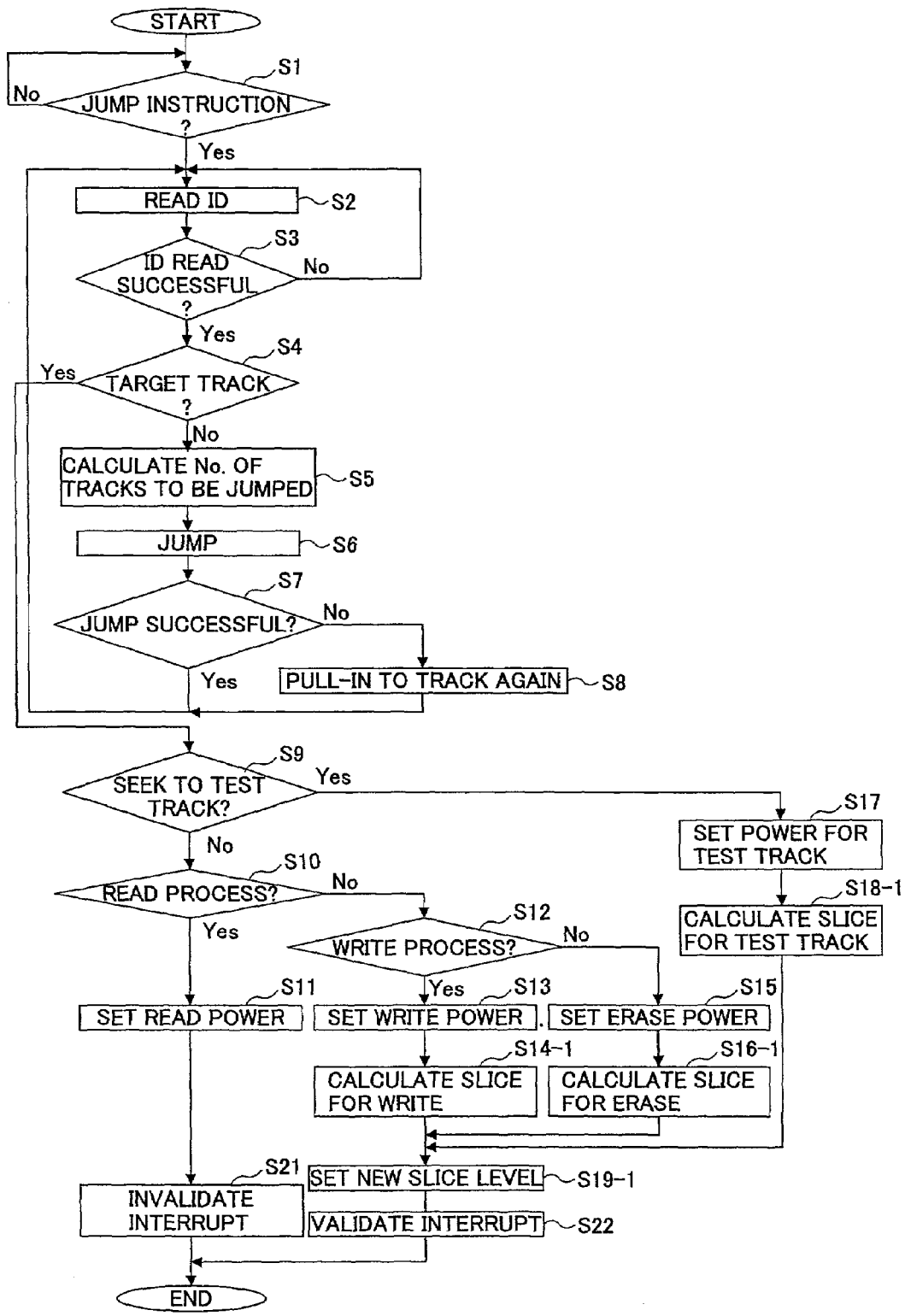
FIG. 6 is a flow chart for explaining the operation of the MPU of the second embodiment of the storage apparatus.

FIG. 6 is a flow chart for explaining the operation of the MPU 112 of this second embodiment of the storage apparatus according to the present invention. The process shown in FIG. 6 is started when a seek command is issued from the host unit, for example. In FIG. 6, those steps which are the same as those corresponding steps in FIG. 4 are designated by the same reference numerals, and a description thereof will be omitted.

In FIG. 6, if the decision result in the step S10 is YES, the step S11 sets the power of the light source of the light beam emitted from the optical head 3 to the read power which is dependent on the sector, of the magneto-optical disk 172, including the target track, and the process advances to a step S21. At the time of the read, there is no possibility of destroying the data on the magneto-optical disk 172. Hence, the step S21 invalidates the interrupt to the write/erase process, which is generated responsive to the shock detection signal from the comparator 44, and the process ends so that the operation may advance to a known read process.

If the decision result in the step S12 is YES, the step S13 sets the power of the light source of the light beam emitted from the optical head 3 to the write power which is dependent on the sector, of the magneto-optical disk 172, including the target track. In addition, a step S14-1 calculates a write slice level for detecting the shock, and the process advances to a step S19-1 which will be described later. If the decision result in the step S12 is NO, the step S15 sets the power of the light source of the light beam emitted from the optical head 3 to the erase power which is dependent on the sector, of the magneto-optical disk 172, including the target track. Further, a step S16-1 calculates an ease slice level for detecting the shock, and the process advances to the step S19-1 which will be described later.

For example, the write slice level can be obtained from the following first order formula, where SRSL denotes a write slice level, SRSLD denotes a default value of the write slice level SRSL, C denotes a coefficient having a negative value, and X denotes a ratio, described in ±%, of a write power at the time of an off-track and a write power at the time when the center of the track is scanned by the light beam.

$$SRSL = SRSLD + C \times X$$

Accordingly, when the write power is increased, the write slice level for detecting the shock is decreased, so that the shock can be monitored under a severe condition. On the other hand, when the write power is decreased, the write slice level for detecting the shock is increased, so that the shock can be monitored under a more relaxed condition.

Similarly, the erase slice level can be obtained from the following first order formula, where SESL denotes an erase slice level, SESLD denotes a default value of the erase slice level SRSL, D denotes a coefficient having a negative value, and X denotes a ratio, described in ±%, of a write power at the time of an off-track and a write power at the time when the center of the track is scanned by the light beam. Normally, D<C, and the power dependencies of the erase slice level and the write slice level are different.

$$SESL=SESLD+D\times X$$

Hence, when the erase power is increased, the erase slice level for detecting the shock is decreased, so that the shock can be monitored under a severe condition. On the other hand, when the erase power is decreased, the erase slice level for detecting the shock is increased, so that the shock can be monitored under a more relaxed condition.

If the decision result in the step S9 is YES, the step S17 sets the power of the light source of the light beam emitted from the optical head 3 to a read/write/erase power which is dependent on the test track of the magneto-optical disk 172. Moreover, a step S18-1 calculates a write/erase slice level for detecting the shock, for the test track of the magneto-optical disk 172, and the process advances to the step S19-1. The write/erase slice level for detecting the shock for the test track is normally set to a value which is greater than the write/erase slice level for detecting the shock during the normal write/erase process, so that the shock is monitored under a relaxed condition.

The step S19-1 sets the slice level which is calculated in the step S14-1, S16-1 or S18-1, in the slice setting section 21 or 22, and the process ends. At the time of the write/erase, there is a possibility of destroying the data on the magneto-optical disk 172. Hence, the step S22 validates the interrupt to the write/erase process, which is generated responsive to the shock detection signal from the comparator 44, and the process ends so that the operation may advance to a known write/erase process or a test track read/write/erase process.

In this embodiment, the write/erase slice level for detecting the shock is set, but it is also possible to similarly set a time constant for detecting the shock (hereinafter referred to as a shock detection time constant). In this case, the steps S13 and S14-1 or, the steps S15 and S16-1, shown in FIG. 6, set the shock detection time constant for the write/erase in place of or, in addition to, the calculation and setting of the write/erase slice level. The shock detection time constant may be set by setting the time constant of the noise filter 101 within the MPU 112 based on the comparison result notified from the comparator 44.

Accordingly, it is possible to change and set the write/erase slice level and/or the shock detection time constant for detecting the shock, depending on the change in the optimum write/erase power. The optimum write/erase power is updated with every test write/erase, but during the normal write/erase before and after the updating, the write/erase slice level and/or the shock detection time constant are not changed.

In this embodiment, the reference shock signal supplied to the comparator 44 shown in FIG. 5, that is, the slice level for detecting the shock, is supplied from the MPU 112 via the DAC 43. However, similarly to the first embodiment shown in FIG. 3, it is possible to use the slice setting sections 21 and 22 and the switching circuit 23 to supply the reference shock signal to the comparator 44. In this case, the DAC 43 may be omitted.

The off-track detection function of the first embodiment includes the filtering function of the noise filter 101 for eliminating the media noise of the magneto-optical disk 172, and a time delay of the off-track detection by the firmware of the DSP 116 is unavoidable. For this reason, if the optical head 3 moves at a high speed due to the external vibration or shock applied to the magneto-optical disk unit, there is a possibility that the light beam has already approached the adjacent track by the time the off-track is detected. Therefore, it is possible to monitor the off-track under a more severe condition by decreasing the write/erase slice level for detecting the off-track and by decreasing the filter time constant of the noise filter 101, so that it is possible to detect even a small deviation of the off-track at a high speed. However, when the off-track is monitored under the severe condition, the media noise is consequently also monitored under the severe condition, and it becomes difficult to improve the productivity of the magneto-optical disk 172. Hence, in this second embodiment, the external vibration or shock is monitored, and the write/erase process is discontinued when the monitored external vibration or shock exceeds a reference value, so as to prevent data destruction on the magneto-optical disk 172.

Figure 7:
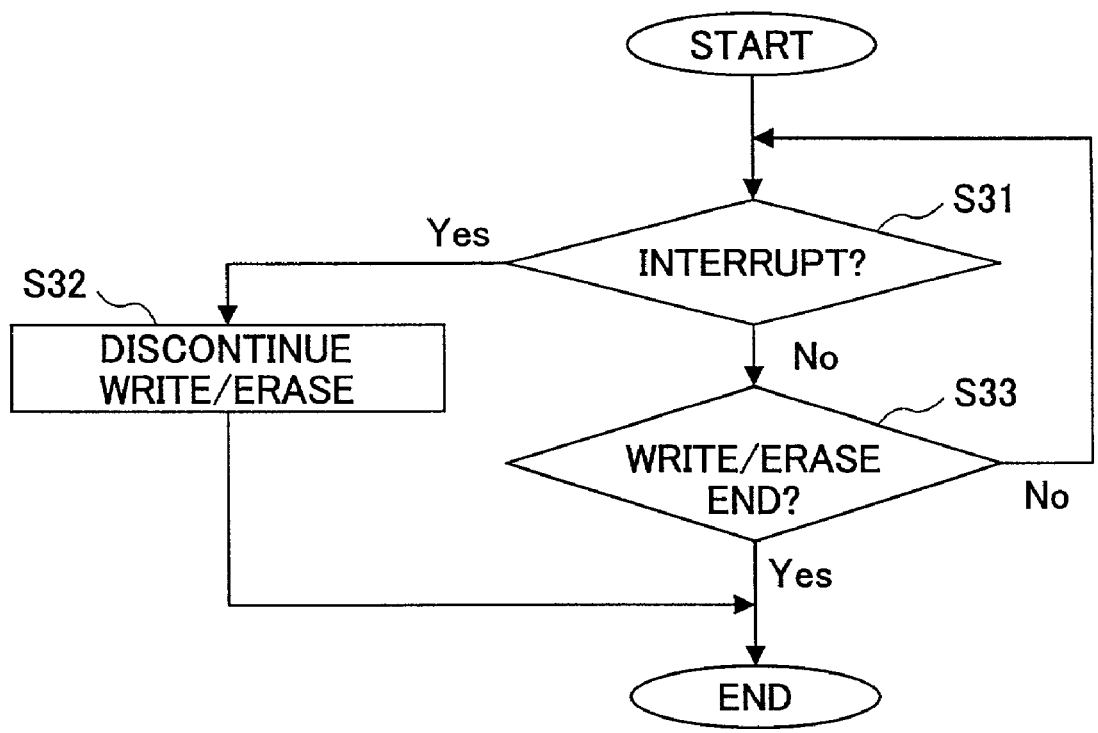
FIG. 7 is a flow chart for explaining an interrupt process of the MPU.

FIG. 7 is a flow chart for explaining an interrupt process of the MPU 112. The process shown in FIG. 7 is carried out by the MPU 112 in the first and second embodiments described above. In FIG. 7, a step S31 decides whether or not the comparison result notification from the comparator 27 or 44 instructs an interrupt to the MPU 112. If the decision result in the step S31 is YES, a step S32 discontinues the write/erase process to prevent data destruction on the magneto-optical disk 172, and the process ends. On the other hand, if the decision result in the step S31 is NO, a step S33 decides whether or not the write/erase process has ended. If the decision result in the step S33 is NO, the process returns to the step S31. The process ends if the decision result in the step S33 is YES.

Next, a description will be given of the processes of the MPU 112, the ODC 114 and the DSP 116 for a case where a write command is issued from the host unit, by referring to FIGS. 9 and 10.

Figure 9:
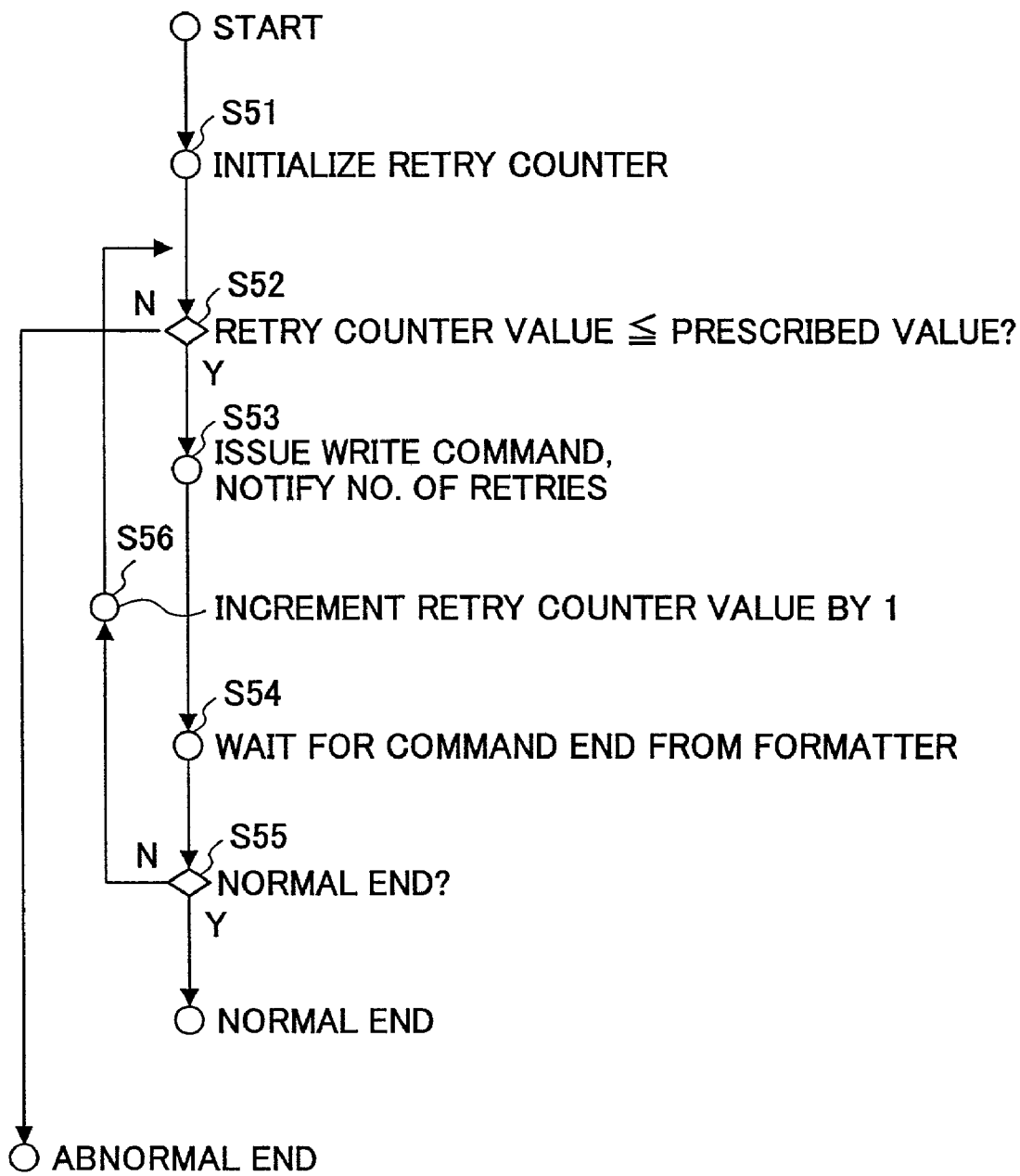
FIG. 9 is a flow chart for explaining processes of the MPU and an ODC when a write command is issued from a host unit.

FIG. 9 is a flow chart for explaining a firmware process of the MPU 112 and the ODC 114 when the write command is issued from the host unit. When the write command is issued from the host unit and the process shown in FIG. 9 is started, a step S51 initializes a value of a retry counter within the MPU 112. A step S52 decides whether or not the value of the retry counter is less than or equal to a prescribed value, and the process ends by an abnormal end if the decision result in the step S52 is NO. On the other hand, if the decision result in the step S52 is YES, a step S53 issues a write command, and notifies a number of retries to the MPU 112, so as to start the process of the MPU 112 and the DSP 116 which will be described later in conjunction with FIG. 10. A step S54 waits for a command end from the formatter 114-1 which will occur when the process shown in FIG. 10 ends, and a step S55 decides whether or not the process ends by a normal end. If the decision result in the step S55 is NO, a step S56 increments the value of the retry counter by one, and the process returns to the step S52. On the other hand, the process ends by the normal end if the decision result in the step S55 is YES.

FIG. 10 is a flow chart for explaining the firmware process of the MPU 112 and the DSP 116 for a case where the write command is issued from the host unit. When the write command is issued by the step S53 shown in FIG. 9 and the process shown in FIG. 10 is started, a step S61 sets a write mode flag to the memory 118. A step S62 carries out the process at the time of the seek of the first embodiment described above in conjunction with FIG. 4 or, the process at the time of the seek of the second embodiment described above in conjunction with FIG. 6, and notifies the number of retries to the MPU 112. A step S63 decides whether or not the process ends by a normal end, and the process ends by an abnormal end if the decision result in the step S63 is NO.

On the other hand, if the decision result in the step S63 is YES, a step S64 sets write parameters and commands in the formatter 114-1, and the process ends by a normal end.

Firmware processes similar to the firmware processes shown in FIGS. 9 and 10 are also carried out when the command issued from the host unit is a read/erase command.

The first and second embodiments described above may be appropriately combined. In other words, the parameters which are calculated and set depending on the write/erase power of the light beam may be a combination of two or more arbitrary parameters selected from the write/erase slice level for detecting the off-track, the off-track detection time constant, the write/erase slice level for detecting the shock, and the shock detection time constant.

In addition, the parameters may be calculated in advance and stored in the memory 118 in the form of a table so that the parameters may be read from the table when necessary. FIG. 8 is a diagram for explaining a relationship of the write power and various parameters within such a table. As shown in FIG. 8, the table stores the value of the retry counter, the optimum write power, the write slice level for detecting the off-track with respect to various write powers, the off-track detection time constant, the write slice level for detecting the shock, and the shock detection time constant. For the sake of convenience, FIG. 8 only shows the parameters with respect to the write power. Of course, the parameters may be calculated with respect to the erase power and stored in a similar table.

Each of the embodiments described above takes into consideration the compatibility of the storage apparatus according to the present invention and the conventional storage apparatus. In other words, the functions of the present invention are made not to operate with respect to a low-density recording medium having a storage capacity of less than 2.3 GB, for example. But if the compatibility of the storage apparatus according to the present invention and the conventional storage apparatus does not need to be taken into consideration, the functions of the present invention may be made to operate with respect to the low-density recording medium. In this case, the method of judging the type of recording medium is not limited to the method of judging the type from the pits of the ID portion as described above, and it is possible to employ other methods such as a method which reads media information from a control information region of the recording medium.

In addition, the application of the present invention is not limited to the magneto-optical disk unit, and the present invention is similarly applicable to various kinds of storage apparatuses including storage apparatuses which use optical recording media of the magneto-optical, phase change type and the like employing systems different from that described above, and storage apparatuses which use a light beam to record information on a magnetic recording medium as variations in magneto-optical properties.

Further, the present invention is not limited to these embodiments, but various variations and modifications may be made without departing from the scope of the present invention.

What is claimed is:

1. A write and/or erase method for a storage apparatus which writes and/or erases information by irradiating a light beam with respect to a target track on a recording medium, comprising the steps of:
   (a) setting a write and/or erase power of the light beam with respect to the target track; and
   (b) setting a write and/or erase slice level that is used to detect an off-track of the light beam with respect to the target track depending on the write and/or erase power, wherein said step (b) decreases the write and/or erase slice level depending on an increase of the write and/or erase power or, increases the write and/or erase slice level depending on a decrease of the write and/or erase power.

2. The write and/or erase method as claimed in claim 1, wherein said step (b) also sets an off-track detection time constant depending on the write and/or erase power.

3. The write and/or erase method as claimed in claim 1, wherein said step (b) also sets a shock detection time constant that is used to detect an external vibration or shock depending on the write and/or erase power.

4. A write and/or erase method for a storage apparatus which writes and/or erases information by irradiating a light beam with respect to a target track on a recording medium, comprising the steps of:
   (a) setting a write and/or erase power of the light beam with respect to the target track is located; and
   (b) setting a write and/or erase slice level that is used to detect an external vibration or shock applied on the storage apparatus with respect to the target track depending on the write and/or erase powers, wherein said step (b) decreases the write and/or erase slice level depending on an increase of the write and/or erase power or, increases the write and/or erase slice level depending on a decrease of the write and/or erase power.

5. The write and/or erase method as claimed in claim 4, wherein said step (b) also sets an off-track detection time constant depending on the write and/or erase power.

6. The write and/or erase method as claimed in claim 4, wherein said step (b) also sets a shock detection time constant that is used to detect an external vibration or shock depending on the write and/or erase power.

7. A write and/or erase method for a storage apparatus which writes and/or erases information by irradiating a light beam with respect to a target track on recording medium, comprising the steps of:
   (a) setting a write and/or erase power of the light beam with respect to the target track; and
   (b) setting at least one parameter selected from write and/or erase parameters depending on the write and/or erase power, said write and/or erase parameters including a first write and/or erase slice level that is used to detect an off-track of the light beam with respect to the target track, an off-track detection time constant, a second write and/or erase slice level that is used to detect an external vibration or shock applied on the storage apparatus, and a shock detection time constant that is used to detect the external vibration or shock, wherein said step (b) decreases at least the first or second write and/or erase slice level depending on an increase of the write and/or erase power or, increases at least the first or second write and/or erase slice level depending on a decrease of the write and/or erase power, as the at least one parameter.

8. The write and/or erase method as claimed in claim 7, wherein a dependency with which the write parameters are set with respect to the write power is different from a dependency with which the erase parameters are set with respect to the erase power.

9. The write and/or erase method as claimed in claim 7, further comprising the step of:
   (c) judging a type of the recording medium, said step (b) being carried out when said step (c) judges that the recording medium is a high-density recording medium.

10. A storage apparatus which writes and/or erases information by irradiating a light beam with respect to a target track on a recording medium, comprising:
a first setting section configured to set a write and/or erase power of the light beam with respect to the target track; and
a second setting section configured to set a write and/or erase slice level that is used to detect an off-track of the light beam with respect to the target track depending on the write and/or erase power,
wherein said second setting section decreases the write and/or erase slice level depending on an increase of the write and/or erase power or, increases the write and/or erase slice level depending on a decrease of the write and/or erase power.

11. The storage apparatus as claimed in claim 10, wherein said second setting section also sets an off-track detection time constant depending on the write and/or erase power.

12. The storage apparatus as claimed in claim 10, wherein said second setting section also sets a shock detection time constant that is used to detect an external vibration or shock depending on the write and/or erase power.

13. A storage apparatus which writes and/or erases information by irradiating a light beam with respect to a target track on a recording medium, comprising:
a first setting section configured to set a write and/or erase power of the light beam with respect to the target track; and
a second setting section configured to set a write and/or erase slice level that is used to detect an external vibration or shock applied on the storage apparatus with respect to the target track depending on the write and/or erase power,
wherein said second setting section decreases the write and/or erase slice level depending on an increase of the write and/or erase power or, increases the write and/or erase slice level depending on a decrease of the write and/or erase power.

14. The storage apparatus as claimed in claim 13, wherein said second setting section also sets an off-track detection time constant depending on the write and/or erase power.

15. The storage apparatus as claimed in claim 13, wherein said second setting section also sets a shock detection time constant that is used to detect an external vibration or shock depending on the write and/or erase power.

16. A storage apparatus which writes and/or erases information by irradiating a light beam with respect to a target track on a recording medium, comprising:
a first setting section configured to set a write and/or erase power of the light beam with respect to the target track; and
a second setting section configured to set at least one parameter selected from write and/or erase parameters depending on the write and/or erase power, said write and/or erase parameters including a first write and/or erase slice level that is used to detect an off-track of the light beam with respect to a track on the recording medium, an off-track detection time constant, a second write and/or erase slice level that is used to detect an external vibration or shock applied on the storage apparatus, and a shock detection time constant that is used to detect the external vibration or shock,
wherein said second setting section decreases at least the first or second write and/or erase slice level depending on an increase of the write and/or erase power or, increases at least the first or second write and/or erase slice level depending on a decrease of the write and/or erase power, as the at least one parameter.

17. The storage apparatus as claimed in claim 16, wherein a dependency with which the write parameters are set with respect to the write power is different from a dependency with which the erase parameters are set with respect to the erase power.

18. The storage apparatus as claimed in claim 16, further comprising:
a judging section configured to judge a type of the recording medium,
wherein said second setting section sets said at least one parameter when said judging section judges that the recording medium is a high-density recording medium.

* * * * *